US009726886B1

(12) United States Patent
Kuo (10) Patent No.: US 9,726,886 B1
(45) Date of Patent: Aug. 8, 2017

(54) ADJUSTABLE REFLECTOR OF HEAD-UP DISPLAY AND HEAD-UP DISPLAY COMPRISING THE SAME

(71) Applicant: Shanghai XPT Technology Limited, Shanghai (CN)

(72) Inventor: Bou-Chen Kuo, Taipei (TW)

(73) Assignee: Shanghai XPT Technology Limited, Shanghai (CN)

( * ) Notice: Subject to any disclaimer, the term of this patent is extended or adjusted under 35 U.S.C. 154(b) by 0 days.

(21) Appl. No.: 15/359,510

(22) Filed: Nov. 22, 2016

(30) Foreign Application Priority Data

Sep. 27, 2016 (CN) .......................... 2016 1 0856304

(51) Int. Cl.
| | | |
|---|---|---|
| *G02B 7/182* | (2006.01) | |
| *G02B 26/08* | (2006.01) | |
| *G02B 27/01* | (2006.01) | |
| *B60K 35/00* | (2006.01) | |
| *G06F 3/01* | (2006.01) | |

(52) U.S. Cl.
CPC .......... *G02B 27/0101* (2013.01); *B60K 35/00* (2013.01); *G02B 7/1821* (2013.01); *G02B 27/0149* (2013.01); *B60K 2350/203* (2013.01); *B60K 2350/352* (2013.01); *G02B 2027/0154* (2013.01); *G06F 3/013* (2013.01)

(58) Field of Classification Search
CPC  G02B 27/01; G02B 27/0101; G02B 27/0149; G02B 27/0176; G02B 2027/0154; G02B 2027/0159; G02B 7/1821; G02B 7/1822; G02B 7/1827; G02B 2027/015; G02B 2027/0152; G02B 2027/0161; G02B 2027/0185; B60K 35/00; B60K 2350/2052; B60R 2300/205; B60R 1/00; G06F 3/013; H02S 20/30; H02S 20/32; F24J 2002/5472; F24J 2002/5475; F24J 2002/5479
USPC .................... 359/627–633, 13–14; 108/1–10
See application file for complete search history.

(56) References Cited

U.S. PATENT DOCUMENTS

| | | | | |
|---|---|---|---|---|
| 2008/0040990 | A1* | 2/2008 | Vendig .................... | F24J 2/405 52/173.3 |
| 2009/0256046 | A1* | 10/2009 | Hausner ................. | F24J 2/5232 248/398 |
| 2015/0070773 | A1* | 3/2015 | Wang .................. | G02B 27/0176 359/631 |
| 2015/0234458 | A1* | 8/2015 | Hsieh .................. | G02B 27/0172 345/156 |

(Continued)

*Primary Examiner* — Bumsuk Won
*Assistant Examiner* — Ephrem Mebrahtu
(74) *Attorney, Agent, or Firm* — Winston Hsu (57) ABSTRACT

An adjustable reflector of a head-up display includes a base, a supporting frame, a control module, a pivot member, an adjusting frame and a reflecting element. A first end of the supporting frame is fixed to the base. The control module includes a flexible transmission member and a driving unit for driving the flexible transmission member to move. The pivot member is configured to move with the flexible transmission member. A first end of the adjusting frame is pivoted to the pivot member, and a second end of the adjusting frame is rotatable around the first end of the adjusting frame. A first side of the adjusting frame is slidably connected to a second end of the supporting frame. The reflecting element is arranged on a second side of the adjusting frame for reflecting a light beam generated by an image source to an optical combiner.

15 Claims, 6 Drawing Sheets

(56) References Cited

U.S. PATENT DOCUMENTS

| | | | |
|---|---|---|---|
| 2016/0070102 A1* | 3/2016 | Takamatsu | G02B 27/0149 |
| | | | 359/631 |
| 2016/0291325 A1* | 10/2016 | Kasahara | G02B 27/0101 |
| 2016/0299341 A1* | 10/2016 | Yoshida | G02F 1/13439 |
| 2016/0313562 A1* | 10/2016 | Saisho | G02B 27/0179 |
| 2016/0362002 A1* | 12/2016 | Aoki | G02B 27/0101 |

* cited by examiner

ADJUSTABLE REFLECTOR OF HEAD-UP DISPLAY AND HEAD-UP DISPLAY COMPRISING THE SAME

BACKGROUND OF THE INVENTION

1. Field of the Invention

The present invention relates to an adjustable reflector of a head-up display, and more particularly, to an adjustable reflector of a head-up display with simplified structure and improved image stability.

2. Description of the Prior Art

Figure 1:
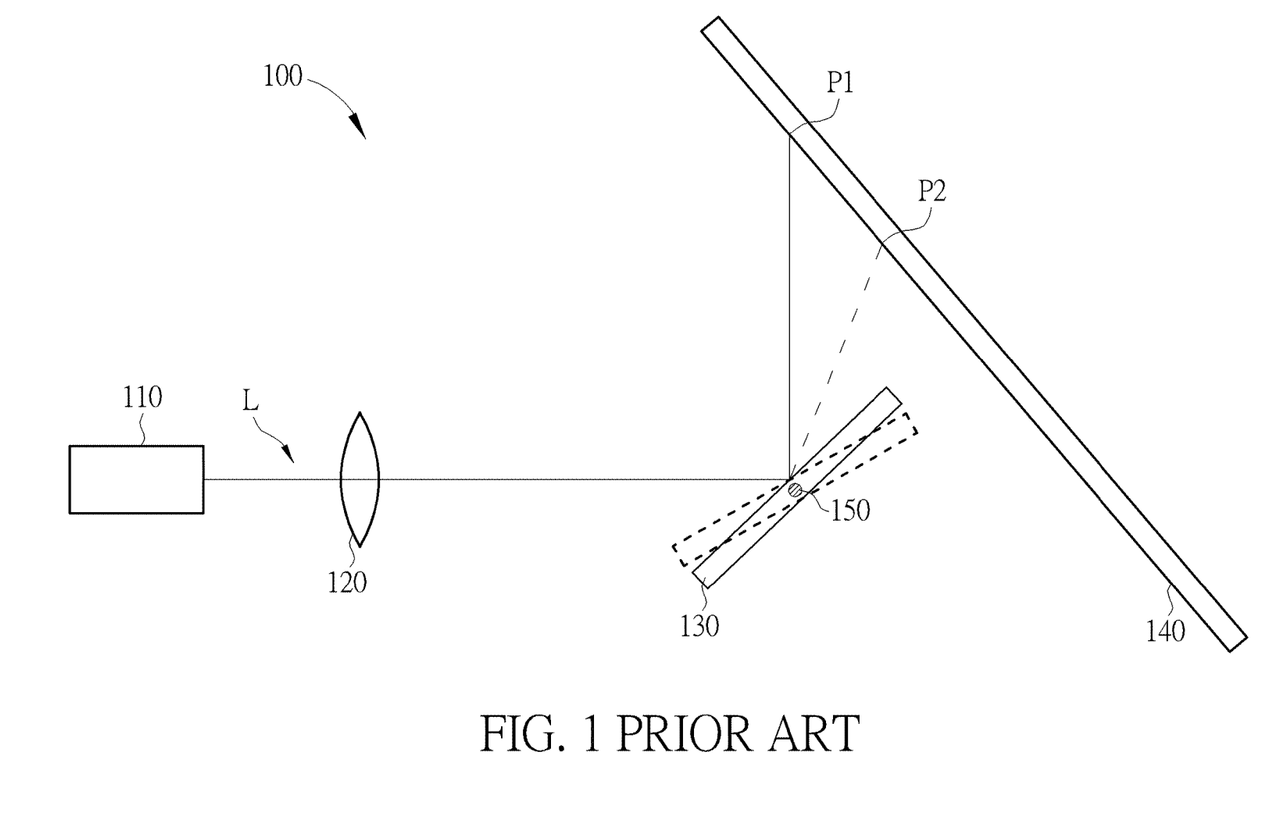
FIG. 1 is a diagram showing a head-up display of the prior art.

Please refer to FIG. 1. FIG. 1 is a diagram showing a head-up display of the prior art. Generally, the head-up display 100 of the prior art comprises an image source 110, a lens 120, a reflecting mirror 130 and an optical combiner 140. A light beam L generated by the image source 110 is refracted by the lens 120, and then reflected to the optical combiner 140 by the reflecting mirror 130. The light beam L reflected to the optical combiner 140 forms a virtual image and/or a real image for providing driving information, such as vehicle speed information, time information and navigation information, to driver. Since different drivers have different heights and seating positions, in order to allow the drivers to easily see the information displayed by the head-up display, a reflection angle of the reflecting mirror 130 can be adjusted to reflect the light beam L to an appropriate position on the optical combiner 140. For example, when the driver is shorter, the head-up display 100 can rotate the reflecting mirror 130 for moving an incident position of the light beam L from a first position P1 to a second position P2, which is a lower position, on the optical combiner 140.

In the head-up display 100 of the prior art, the reflecting mirror 130 is fixed to a rotary shaft 150, and the rotary shaft 150 is driven by a motor to rotate, in order to further adjust the reflection angle of the reflecting mirror 130. However, the motor needs to cooperate with a complex gear speed reduction mechanism to drive the rotary shaft 150 for controlling the reflection angle of the reflecting mirror 130 precisely. Therefore, the head-up display 100 of the prior art has a more complex structure. Moreover, the reflecting mirror 130 is only fixed to the rotary shaft 150 without being supported by other elements. Thus the reflecting mirror 130 is easily deflected by shock, such that the head-up display 100 has lower image stability.

SUMMARY OF THE INVENTION

The present invention provides an adjustable reflector of a head-up display comprising a base, a supporting frame, a control module, a pivot member, an adjusting frame and a reflecting element. The supporting frame has a first end and a second end opposite to the first end. The first end of the supporting frame is fixed to the base. The control module comprises a flexible transmission member and a driving unit. The driving unit is connected to the flexible transmission member and configured to drive the flexible transmission member to move. The pivot member is arranged on the flexible transmission member for moving with the flexible transmission member. The adjusting frame has a first end and a second end opposite to the first end. The first end of the adjusting frame is pivoted to the pivot member. The second end of the adjusting frame is rotatable around the first end of the adjusting frame. A first side of the adjusting frame is slidably connected to the second end of the supporting frame. The reflecting element is arranged on a second side of the adjusting frame for reflecting a light beam generated by an image source of the head-up display to an optical combiner of the head-up display.

The present invention further provides a head-up display comprising an image source, an optical combiner, and at least one adjustable reflector. The image source is configured to generate a light beam. The optical combiner is configured to display an image according to an incident light beam. The at least one adjustable reflector comprises a base, a supporting frame, a control module, a pivot member, an adjusting frame and a reflecting element. The supporting frame has a first end and a second end opposite to the first end. The first end of the supporting frame is fixed to the base. The control module comprises a flexible transmission member and a driving unit. The driving unit is connected to the flexible transmission member and configured to drive the flexible transmission member to move. The pivot member is arranged on the flexible transmission member for moving with the flexible transmission member. The adjusting frame has a first end and a second end opposite to the first end. The first end of the adjusting frame is pivoted to the pivot member. The second end of the adjusting frame is rotatable around the first end of the adjusting frame. A first side of the adjusting frame is slidably connected to the second end of the supporting frame. The reflecting element is arranged on a second side of the adjusting frame for reflecting the light beam generated by the image source of to the optical combiner.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
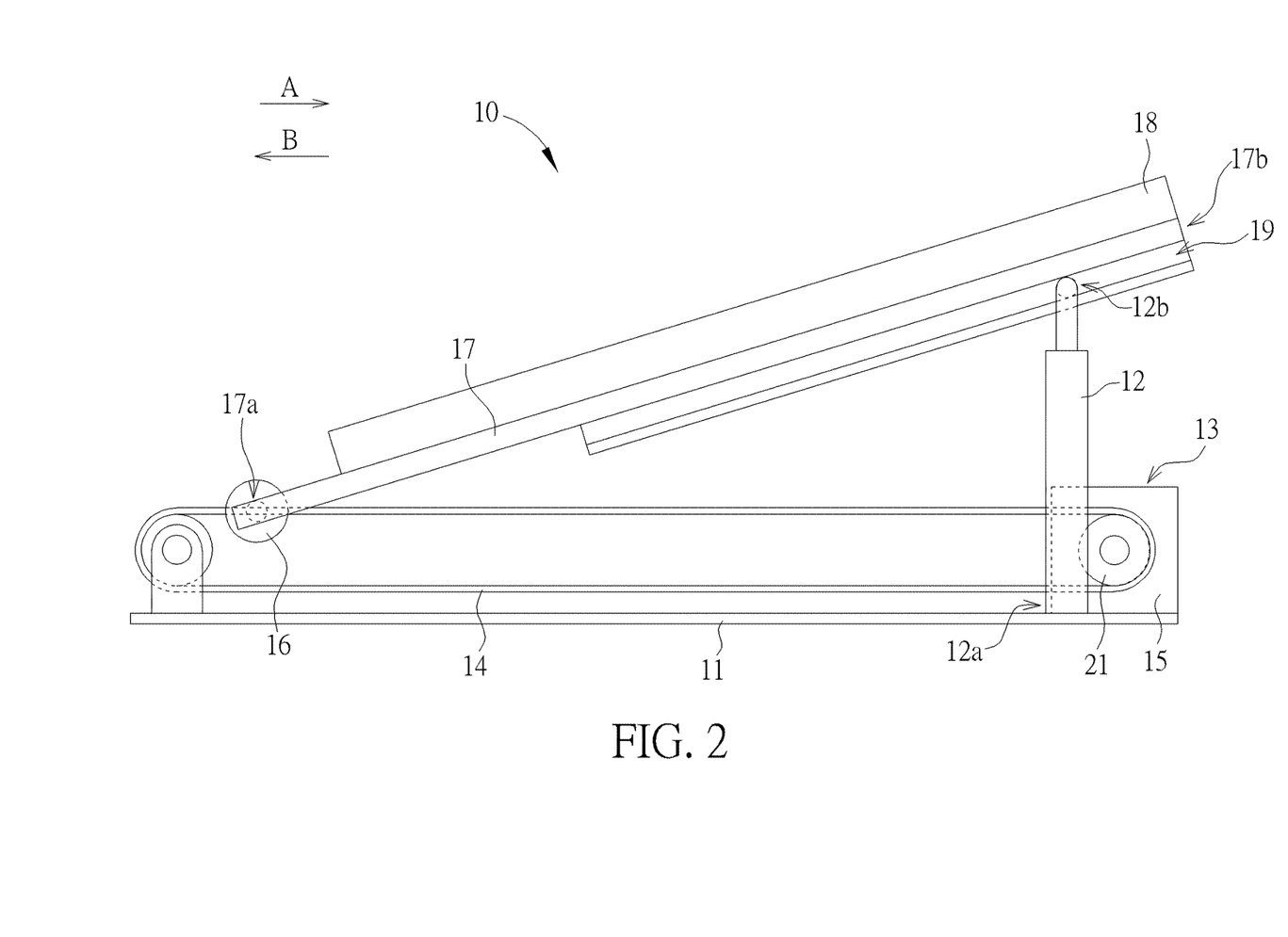
FIG. 2 is a diagram showing an adjustable reflector of the present invention.
Figure 3:
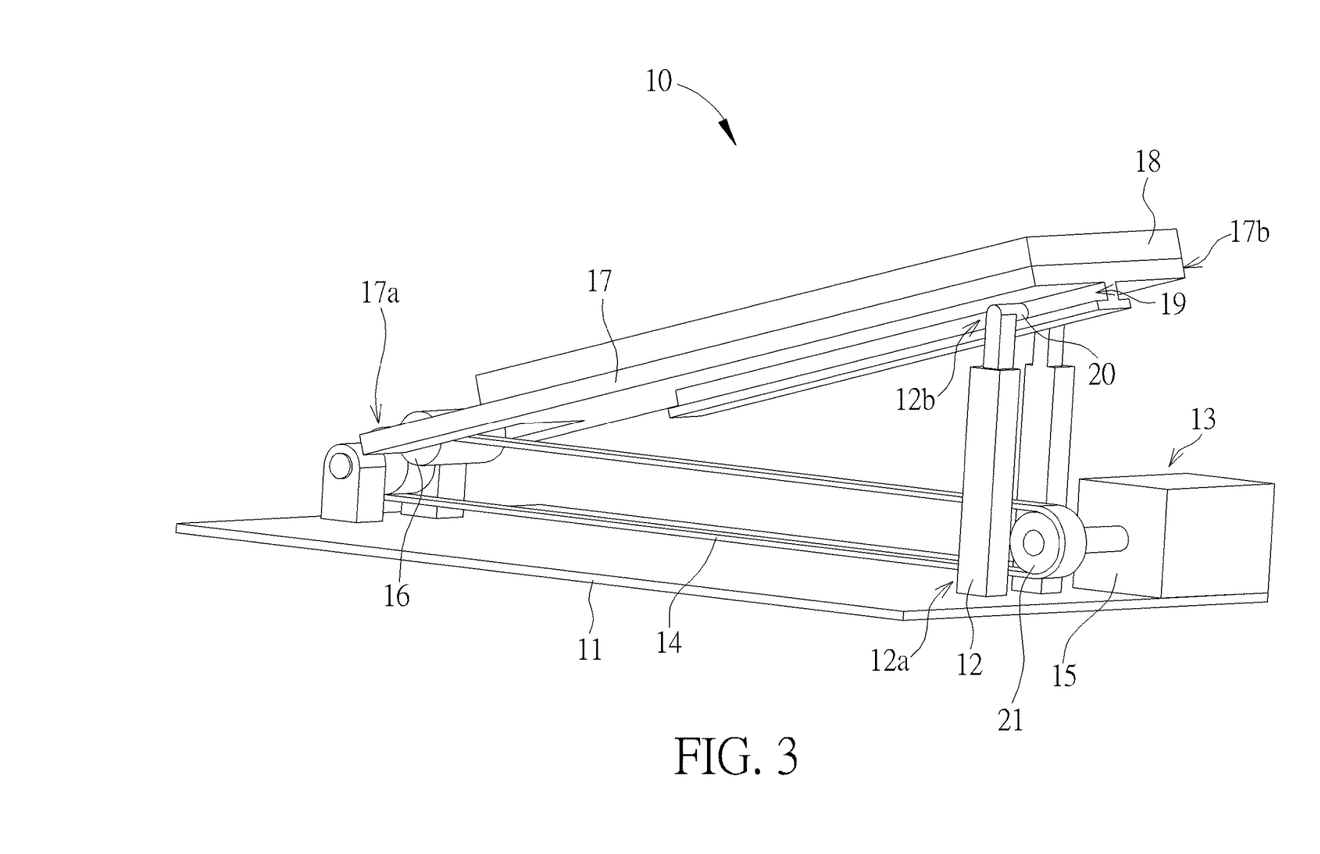
FIG. 3 is a diagram showing the adjustable reflector of FIG. 2 in another angle.

Please refer to FIG. 2 and FIG. 3. FIG. 2 is a diagram showing an adjustable reflector of the present invention. FIG. 3 is a diagram showing the adjustable reflector of FIG. 2 in another angle. As shown in figures, the adjustable reflector 10 of the present invention comprises a base 11, a supporting frame 12, a control module 13, a pivot member 16, an adjusting frame 17 and a reflecting element 18. The supporting frame 12 has a first end 12a and a second end 12b opposite to the first end 12a. The first end 12a of the supporting frame 12 is fixed to the base 11. The control module 13 comprises a flexible transmission member 14 and a driving unit 15. The flexible transmission member 14 can be a rope, belt or chain. The flexible transmission member 14 is bendable and not stretchable. The driving unit 15 (such as comprising a motor) is connected to the flexible transmission member 14 through a roller 21 (or a chain wheel), and configured to drive the flexible transmission member 14 to move. The pivot member 16 is arranged on the flexible transmission member 14 for moving with the flexible transmission member 14. The adjusting frame 17 has a first end 17a and a second end 17b opposite to the first end 17a. The first end 17a of the adjusting frame 17 is pivoted to the pivot member 16, and the second end 17b of the adjusting frame 17 is rotatable around the first end 17a. In addition, a guiding groove 19 is formed on a first side of the adjusting frame 17 (such as a lower side of the adjusting frame 17), and protrusions 20 are formed on the second end 12b of the supporting frame 12 to be accommodated in the guiding groove 19. In other words, the first side of the adjusting frame 17 is slidably connected to the second end 12b of the supporting frame 12. The reflecting element 18 is arranged on the second side of the adjusting frame 17 (such as an upper side of the adjusting frame 17).

According to the above arrangement, when the driving unit 15 drives the flexible transmission member 14 to move, the adjusting frame 17 is further driven by the flexible transmission member 14 through the pivot member 16 to rotate for changing an included angle between the adjusting frame 17 and the base 11, so as to further change a reflection angle of the reflecting element 18. For example, when the driving unit 15 drives the flexible transmission member 14 to move the pivot member 16 along a first direction A, the included angle between the adjusting frame 17 and the base 11 is increased; and when the driving unit 15 drives the flexible transmission member 14 to move the pivot member 16 along a second direction B, the included angle between the adjusting frame 17 and the base 11 is decreased. The adjustable reflector 10 of the present invention can determine a position of the pivot member 16 by controlling a number of turns of the roller 21, in order to further determine the included angle between the adjusting frame 17 and the base 11. Therefore, the adjustable reflector 10 of the present invention can precisely control the reflection angle of the reflecting element 18 without utilizing a complex gear speed reduction mechanism. On the other hand, in addition to pivoting to the pivot member 16, the adjusting frame 17 is also connected to the supporting frame 12, such that the reflecting element 18 is not easy to be deflected by shock. Moreover, the flexible transmission member 14 of the present invention can absorb shock of the adjusting frame 17 caused by an external force, in order to further improve image stability of the head-up display 10.

In the present embodiment, the reflecting element 18 is a plane mirror, but the present invention is not limited thereto. In other embodiments of the adjustable reflector of the present invention, the reflecting element 18 can be a curved mirror (such as a concave mirror). The adjustable reflector of the present invention can be arranged with an appropriate type of the reflecting element according to design requirements. In addition, the structure of the guiding groove 19 in FIG. 3 is shown for example, the present invention is not limited thereto. In the other embodiments of the adjustable reflector of the present invention, the guiding groove 19 can have a different structure. Moreover, both ends of the guiding groove 17 can be arranged with blocking structures for preventing the second end 12b of the supporting frame 12 from moving out of the guiding groove 19.

Figure 4:
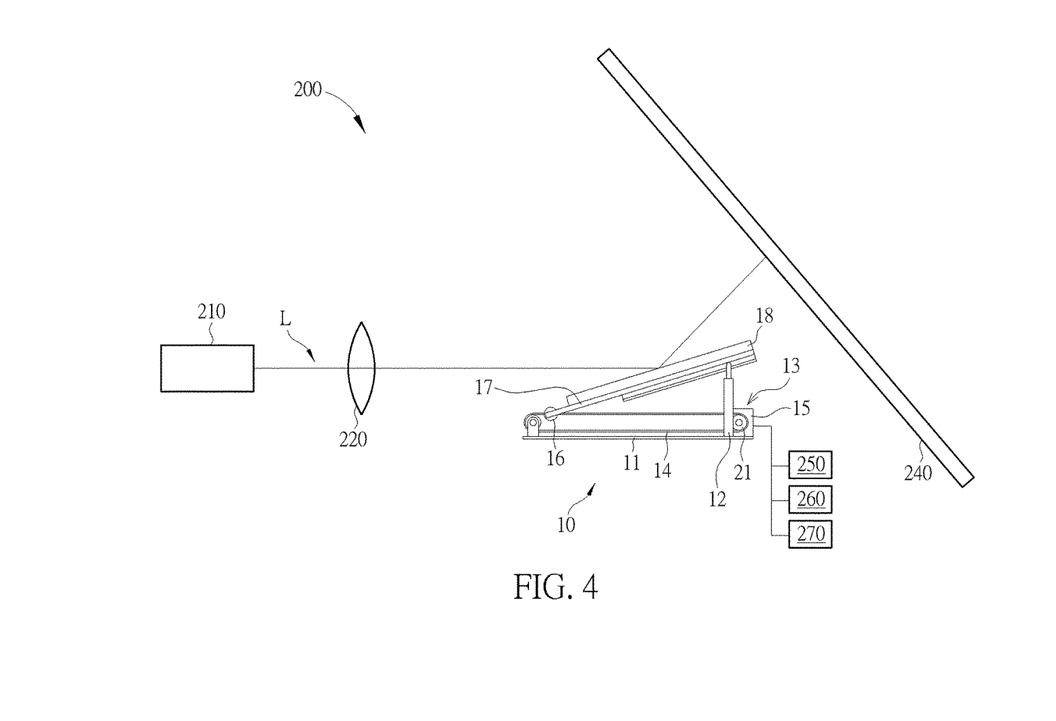
FIG. 4 is a diagram showing a head-up display according to a first embodiment of the present invention.

Please refer to FIG. 4. FIG. 4 is a diagram showing a head-up display according to a first embodiment of the present invention. As shown in FIG. 4, the head-up display 200 of the present invention comprises an image source 210, a lens 220, an adjustable reflector 10 and an optical combiner 240. The image source 210 is configured to generate a light beam L according to driving information, and a pattern of the light beam corresponds to the driving information, such as velocity speed information, time information, and navigation information. The lens 220 is arranged between the image source 210 and the adjustable reflector 10 for refracting the light beam L generated by the image source 210. The adjustable reflector 10 is configured to reflect the light beam L passed through the lens 220 to the optical combiner 240. In the present embodiment, the reflecting element 13 of the adjustable reflector 10 is a plane mirror. When the adjustable reflector 10 reflects the light beam L to the optical combiner 240, the light beam L forms a virtual image and/or a real image on the optical combiner 240 for providing the driving information (e.g. the velocity speed information, time information, and navigation information) to a driver. The virtual image and/or the real image on the optical combiner 240 overlaps a scene in front of the driver without affecting the driver's sight. On the other hand, the optical combiner 240 can be formed with a plurality of scattering units (e.g. convex structures) for scattering light, in order to further increase a viewing angle of the image on the optical combiner 240.

In addition, the head-up display 200 of the present invention can further comprise a gravity sensor 250 configured to sense the included angle between the head-up display 200 and a horizontal plane. The control module 13 can be further configured to adjust the included angle between the adjusting frame 17 and the base 11 according to a sensing result of the gravity sensor 250. For example, when a vehicle moves uphill, the driver's sight is lower. The control module 13 can adjust the included angle between the adjusting frame 17 and the base 11 according to the sensing result of the gravity sensor 250, in order to move an incident position of the light beam L on the optical combiner 240 downward. When the vehicle moves downhill, the driver's sight is higher. The control module 13 can adjust the included angle between the adjusting frame 17 and the base 11 according to the sensing result of the gravity sensor 250, in order to move the incident position of the light beam L on the optical combiner 240 upward.

Furthermore, the head-up display 200 of the present invention can further comprise an eyeball tracking sensor 260 configured to sense a relative position between the head-up display 200 and the driver. The control module 13 can be further configured to adjust the included angle between the adjusting frame 17 and the base 11 according to a sensing result of the eyeball tracking sensor 260. For example, when the driver is taller, the control module 13 can adjust the included angle between the adjusting frame 17 and the base 11 according to the sensing result of the eyeball tracking sensor 260, in order to move the incident position of the light beam L on the optical combiner 240 upward. When the driver is shorter, the control module 13 can adjust the included angle between the adjusting frame 17 and the base 11 according to the sensing result of the eyeball tracking sensor 260, in order to move the incident position of the light beam L on the optical combiner 240 downward.

On the other hand, the control module 13 can be electrically connected to a speedometer 270 of the vehicle for adjusting the included angle between the adjusting frame 17 and the base 11 according to a sensing result of the speedometer 270. For example, when the vehicle speed is greater, the driver looks at a farther place, such that the driver's sight is higher. The control module 13 can adjust the included angle between the adjusting frame 17 and the base 11 according to the sensing result of the speedometer 270, in order to move the incident position of the light beam L on the optical combiner 240 upward. When the vehicle speed is smaller, the driver looks at a nearer place, such that the driver's sight is lower. The control module 13 can adjust the included angle between the adjusting frame 17 and the base 11 according to the sensing result of the speedometer 270, in order to move the incident position of the light beam L on the optical combiner 240 downward.

Figure 5:
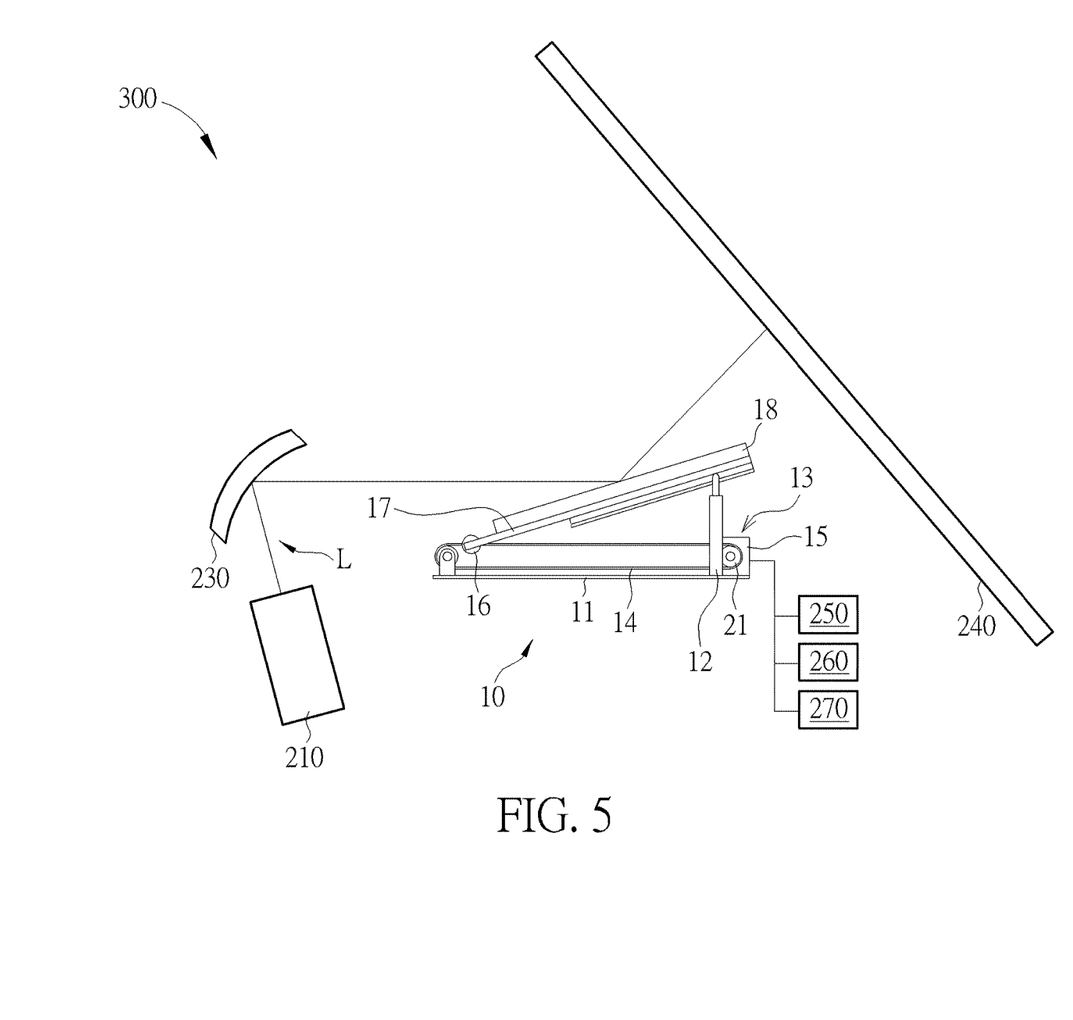
FIG. 5 is a diagram showing a head-up display according to a second embodiment of the present invention.

Please refer to FIG. 5. FIG. 5 is a diagram showing a head-up display according to a second embodiment of the present invention. In the embodiment of FIG. 5, the head-up display 300 utilizes a curved mirror 230 to replace the lens. The curved mirror 230 is configured to reflect the light beam L generated by the image source 210 to the reflecting element 18. The reflecting element 18 further reflects the light beam L to the optical combiner 240 for forming a virtual image and/or a real image. Since operation of the head-up display of the second embodiment of the present invention is similar to operation of the head-up display of the first embodiment of the present invention, no further illustration is provided.

Figure 6:
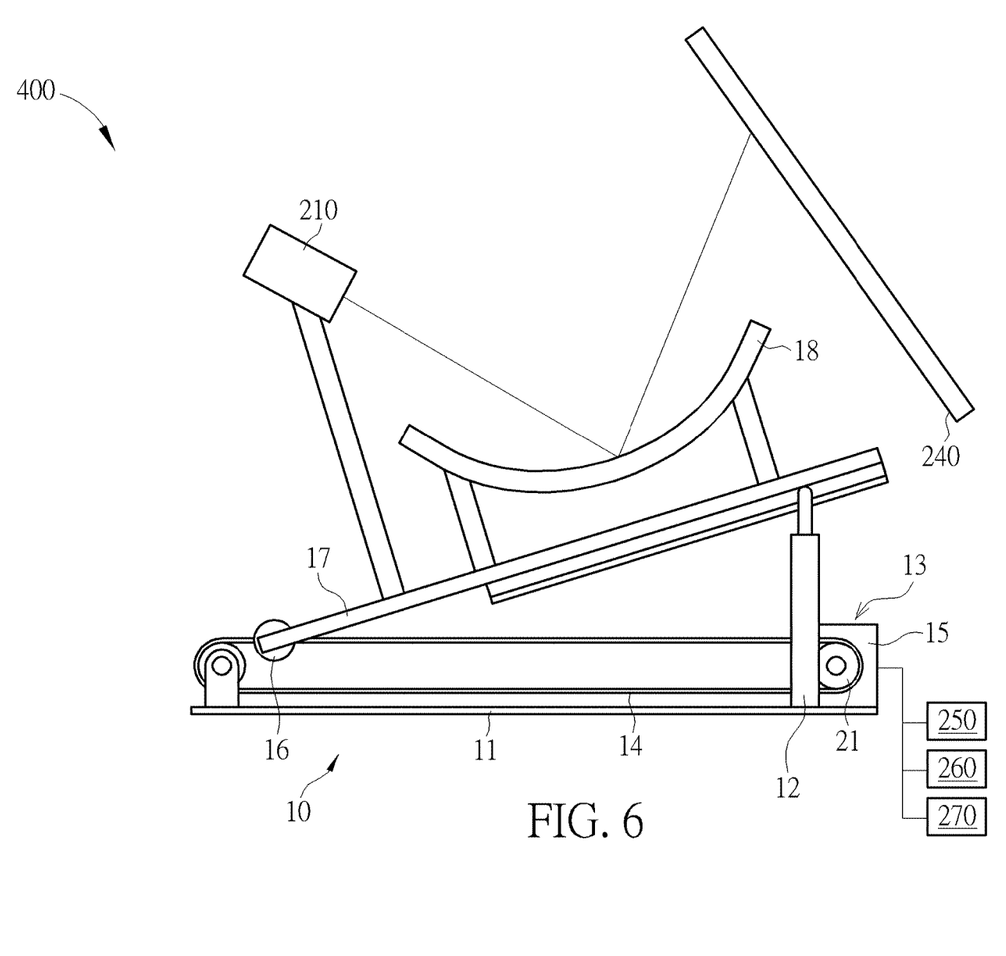
FIG. 6 is a diagram showing a head-up display according to a third embodiment of the present invention.

Please refer to FIG. 6. FIG. 6 is a diagram showing a head-up display according to a third embodiment of the present invention. In the embodiment of FIG. 6, the reflecting element 13 of the adjustable reflector 10 is a curved mirror. Since the curved mirror can reflect the light beam L generated by the image source 210 to the optical combiner 240 for directly forming a virtual image and/or a real image on the optical combiner 240, the lens can be omitted. In addition, a distance between the curved mirror 13 and the image source 210 must be fixed, thus the image source 210 is configured to rotate along with the adjusting frame 17. For example, the image source 210 can be connected to the adjusting frame 17 for rotating along with the adjusting frame 17.

In FIG. 4 to FIG. 6, the arrangements of the head-up display of the present invention are shown for example, the present invention is not limited thereto. In the other embodiments of the present invention, positions, angles and quantities of the image source 210, the lens 220, the curved mirror 230, the adjustable reflector 10 and the optical combiner 240 can be changed according to design requirement. For example, in addition to placing the base 11 of the adjustable reflector 10 horizontally, the base 11 of the adjustable reflector 10 can also be placed vertically or obliquely.

In contrast to the prior art, the adjustable reflector of the present invention can precisely control the reflection angle of the reflecting element without utilizing a complex gear speed reduction mechanism. Therefore, the structure of the head-up display of the present invention can be simplified. Furthermore, comparing to the head-up display of the prior art having the reflecting mirror only fixed to the rotary shaft, the adjusting frame of the head-up display of the present invention is fixed by the pivot member and the supporting frame. Therefore, the reflecting element on the adjusting frame of the head-up display of the present invention is not easy to be deflected by shock, so as to improve image stability of the head-up display of the present invention. In addition, the flexible transmission member of the head-up display of the present invention can absorb shock of the adjusting frame caused by the external force, in order to further improve image stability of the head-up display of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustable reflector of a head-up display comprising:
   a base;
   a supporting frame having a first end and a second end opposite to the first end, the first end of the supporting frame being fixed to the base;
   a control module, comprising:
      a flexible transmission member; and
      a driving unit connected to the flexible transmission member and configured to drive the flexible transmission member to move;
   a pivot member arranged on the flexible transmission member for moving with and configured to be driven by the flexible transmission member to linearly move toward or away from the driving unit;
   an adjusting frame having a first end and a second end opposite to the first end, the first end of the adjusting frame being pivoted to the pivot member, the second end of the adjusting frame being rotatable around the first end of the adjusting frame, a first side of the adjusting frame being slidably connected to the second end of the supporting frame; and
   a reflecting element arranged on a second side of the adjusting frame for reflecting a light beam generated by an image source of the head-up display to an optical combiner of the head-up display.

2. The adjustable reflector of claim 1, wherein a guiding groove is formed on the first side of the adjusting frame, and a protrusion is formed on the second end of the supporting frame to be accommodated in the guiding groove.

3. The adjustable reflector of claim 1, further comprising a roller, wherein the driving unit is connected to the flexible transmission member through the roller in order to drive the flexible transmission member to move.

4. The adjustable reflector of claim 1, wherein the reflecting element is a curved mirror.

5. The adjustable reflector of claim 1, wherein the reflecting element is a plane mirror.

6. A head-up display, comprising:
   an image source configured to generate a light beam;
   an optical combiner configured to display an image according to an incident light beam; and
   at least one adjustable reflector, comprising:
      a base;
      a supporting frame having a first end and a second end opposite to the first end, the first end of the supporting frame being fixed to the base;
      a control module, comprising:
         a flexible transmission member; and
         a driving unit connected to the flexible transmission member and configured to drive the flexible transmission member to move;
      a pivot member arranged on the flexible transmission member for moving and configured to be driven by the flexible transmission member to linearly move toward or away from the driving unit;
      an adjusting frame having a first end and a second end opposite to the first end, the first end of the adjusting frame being pivoted to the pivot member, the second end of the adjusting frame being rotatable around the first end of the adjusting frame, a first side of the adjusting frame being slidably connected to the second end of the supporting frame; and a reflecting element arranged on a second side of the adjusting frame for reflecting the light beam generated by the image source to the optical combiner.

7. The head-up display of claim 6, wherein a guiding groove is formed on the first side of the adjusting frame, and a protrusion is formed on the second end of the supporting frame to be accommodated in the guiding groove.

8. The head-up display of claim 6, wherein the adjustable reflector further comprises a roller, the driving unit is connected to the flexible transmission member through the roller in order to drive the flexible transmission member to move.

9. The head-up display of claim 6, wherein the reflecting element is a curved mirror.

10. The head-up display of claim 6, wherein the reflecting element is a plane mirror.

11. The head-up display of claim 10, further comprising a curved mirror for reflecting the light beam generated by the image source to the reflecting element.

12. The head-up display of claim 10, further comprising a lens arranged between the image source and the reflecting element for refracting the light beam generated by the image source.

13. The head-up display of claim 6, further comprising a gravity sensor configured to sense an included angle between the head-up display and a horizontal plane, wherein the control module is further configured to adjust the included angle between the adjusting frame and the base according to a sensing result of the gravity sensor.

14. The head-up display of claim 6, further comprising an eyeball tracking sensor configured to sense a relative position between the head-up display device and a user, wherein the control module is further configured to adjust the included angle between the adjusting frame and the base according to a sensing result of the eyeball tracking sensor.

15. The head-up display of claim 6, wherein the control module is electrically connected to a speedometer of a vehicle for adjusting the included angle between the adjusting frame and the base according to a sensing result of the speedometer.

* * * * *